United States Patent [19]

Ditz

[11] Patent Number: 5,515,598
[45] Date of Patent: May 14, 1996

[54] METHOD FOR WINDING AN INNER COIL OF A TRANSFORMER

[75] Inventor: Alfred Ditz, Fuerth, Germany

[73] Assignee: Grundig, E.M.V., Furth/Bay, Germany

[21] Appl. No.: 182,643

[22] Filed: Jan. 14, 1994

[30] Foreign Application Priority Data

Jan. 14, 1993 [DE] Germany ............... 43 00 756.2

[51] Int. Cl.⁶ ................................................. H01F 41/06
[52] U.S. Cl. ..................... 29/605; 29/729; 72/144; 72/148; 242/434.5
[58] Field of Search ........................ 29/605, 173, 729; 72/135, 142, 146, 148, 144, 145; 242/7.02, 7.03, 7.07, 7.14

[56]  References Cited

U.S. PATENT DOCUMENTS 4,882,833  11/1989  Hiramatsu et al. ............ 29/605 X
4,947,543   8/1990  Kawazoe et al. ............... 29/605

FOREIGN PATENT DOCUMENTS

| 3626275 | 2/1988 | Germany . | |
|---|---|---|---|
| 3810037 | 10/1989 | Germany . | |
| 3831721 | 3/1990 | Germany . | |
| 61-182209 | 8/1986 | Japan | 242/7.07 |
| 1-243408 | 9/1989 | Japan | 242/7.07 |
| 987695 | 1/1983 | U.S.S.R. | 242/7.07 |

Primary Examiner—S. Thomas Hughes
Attorney, Agent, or Firm—Kane, Dalsimer, Sullivan, Kurucz, Levy, Eisele & Richard

[57] ABSTRACT

This method is for winding an inner coil of a transformer, the transformer including a ferrite core with an inner groove for receiving the winding, the ferrite core being provided with a radial inlet groove for feeding in and feeding out of the winding wire. The wire is fed through a winding mandrel with a transverse longitudinal bore. The ferrite core is pushed onto the winding mandrel and moved rotatably and axially, thereby forming the inner coil in the inner grove of the ferrite core.

3 Claims, 2 Drawing Sheets

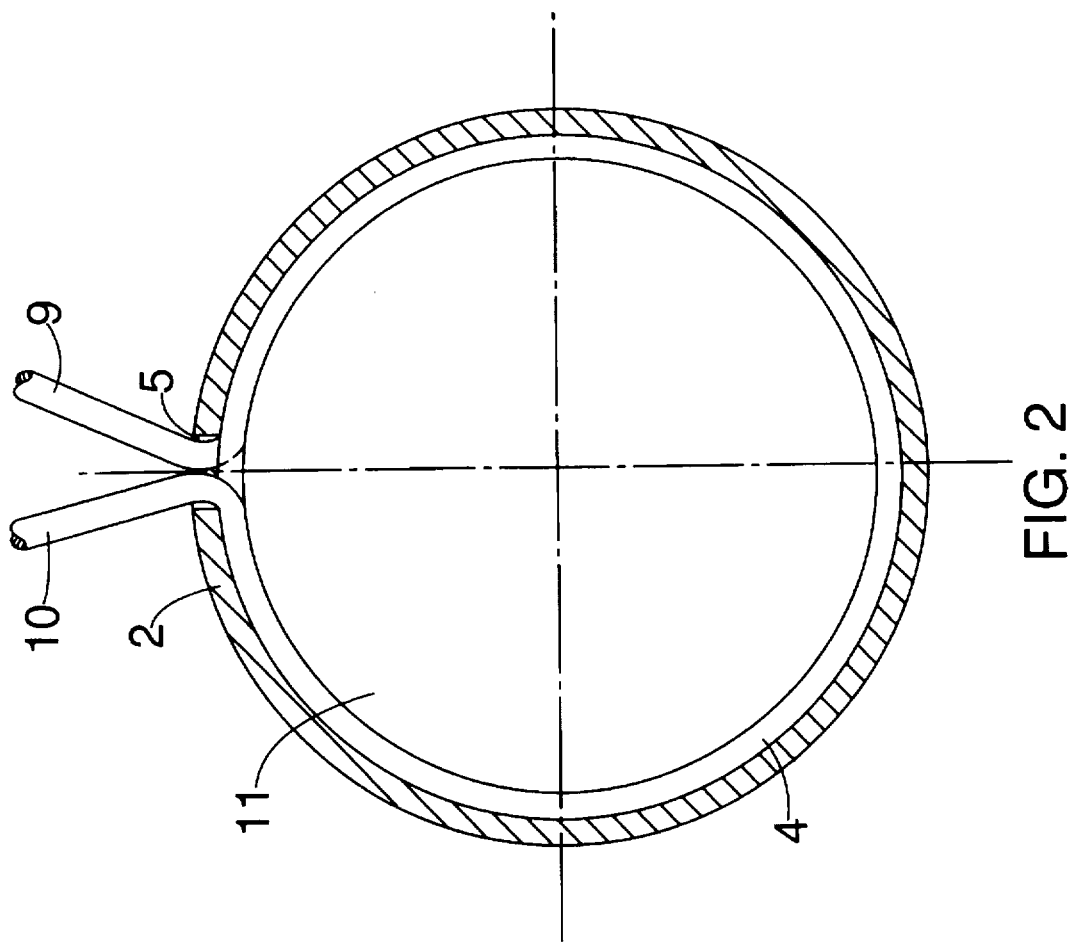
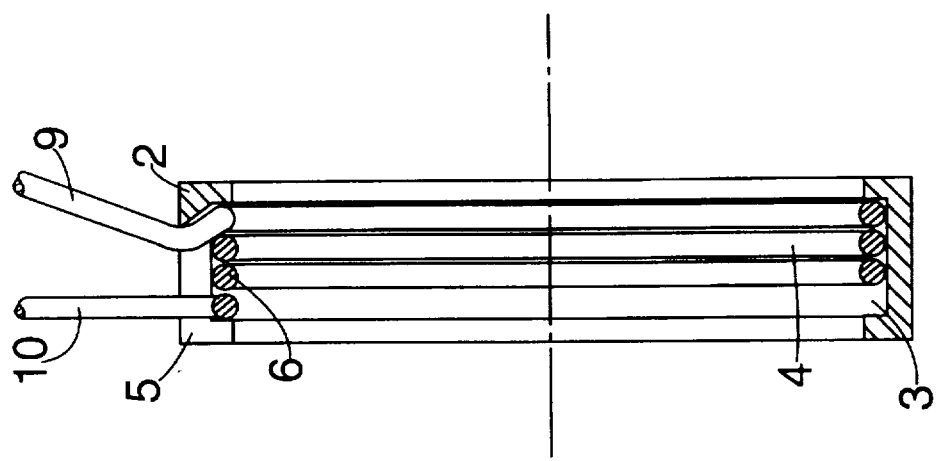

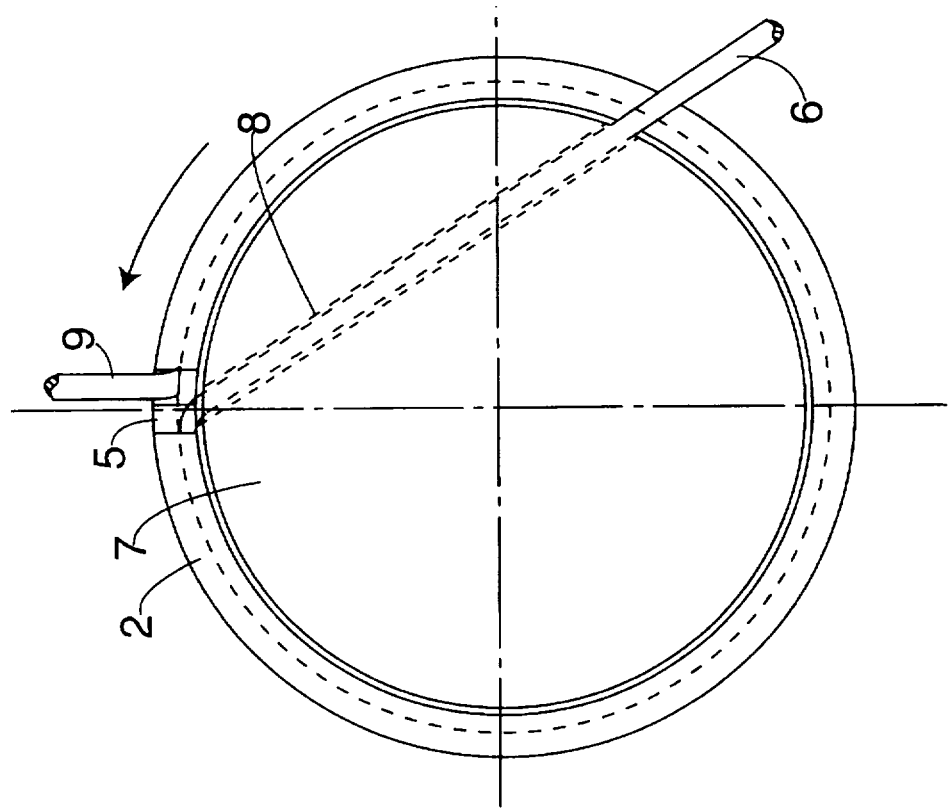
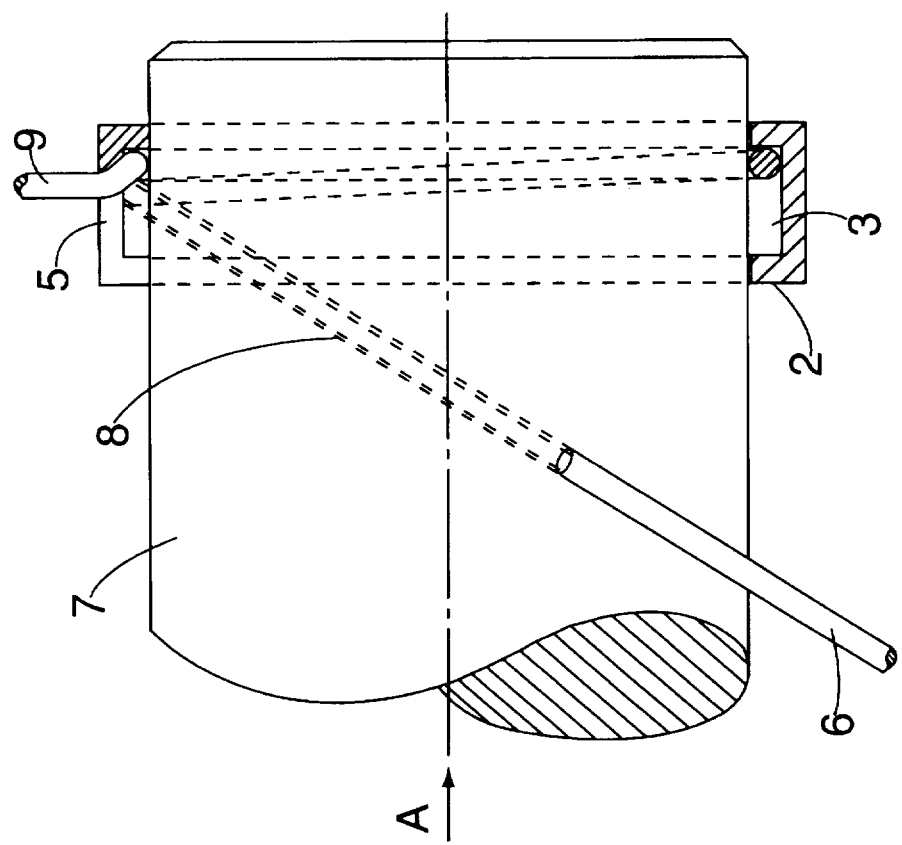
FIG. 4
FIG. 3

METHOD FOR WINDING AN INNER COIL OF A TRANSFORMER

BACKGROUND OF THE INVENTION

1. Field of the Invention

The invention relates to a device for winding an inner coil of a transformer, the transformer of the inner coil including a ferrite core with an inner groove for receiving the coil, the ferrite core being provided with a radial inlet groove for feeding in and feeding out of the winding wire.

2. Description of the Prior Art

It is known in the prior art to employ rotating head wheels with one or a plurality of heads in video recorders or recorder for digital recording and replay of signals to or from a magnetic tape. Thereby the signals are recorded by means of oblique tracks on the magnetic tape. It is further known to employ rotary transformers to communicate the signals between a head wheel and the stationary part of a head drum. These rotary transformers typically include a stationary part which is associated with the stationary head drum and a part associated with the rotating head wheel and rotating therewith. Both the stationary and the moving parts include a coil. A head drum arrangement must have as many transformers as there are heads on the head wheel.

For example, the use of such transformers is disclosed in laid open patent DE-A1-38 10 037. The transformers disclosed therein include inner and outer ferrite cores, each of which include a coil. The signal transformation and communication is performed radially between the ferrite cores mounted in the outermost stationary part and the ones mounted in the inner rotating part.

Due to the miniaturization of head drum units as well as the increased frequency range to be handled and due to the increased numbers of transformers, the size of the transformers must be reduced. This results in higher accuracy requirements for the transformers. This concerns the ferrite cores themselves to a certain extent, for example, the slot between the outer and inner core and, on the other hand, the coils. The coils of a very thin wire (for example, at a magnitude of 0.15 mm. diameter) must be wound very accurately in a very tight space. In order to mount a coil of a specific defined shape in a ferrite core, supporting auxiliary means may be used.

A rotary transformer for a recorder is disclosed in DE-A1-38 31 721 which employs a radially acting transformer. In this case, a plastic core with grooves is employed for the accurate guiding of the wire winding, which can be easily made and which assures a high degree of accuracy of the winding of the coil.

However, the use of such an auxiliary means is rather expensive. Moreover, the handling of a plastic core of such small dimension is also very difficult.

The placement of coils directly into a winding groove of ferrite core of an axial transformer is disclosed in DE-A1-36 26 275. With this device, a wire coil is wound in an axial groove in the plane surface of a ferrite core. This is performed with the assistance of a rotating winding disk which is mounted concentrically to the ferrite core, into which the winding wire is introduced through a guide slot. The purpose of this device is to replace preassembled coils which cannot be inserted into the winding groove because of large tolerances.

OBJECTS AND SUMMARY OF THE INVENTION

It is an object of the invention to provide a device to make the coil of the outer core of a transformer with a high degree of accuracy in a very simple and economical manner. Thereby, the winding wire should be mounted into the inner groove of the outer core without any further additional parts.

This object of the invention is solved by a device for winding an inner coil of a transformer, the transformer of the inner coil including a ferrite core with an inner groove for receiving the coil, the ferrite core being provided with a radial inlet groove for feeding in and feeding out of the winding wire.

The device in accordance with the invention inserts a coil into the inner groove of a ferrite core of a radial transformer. This is necessary because the insertion of a prewound coil into an inner groove is very difficult, on the one hand, and that the accuracy of the inner diameter of the coil must be very high, on the other hand.

BRIEF DESCRIPTION OF THE DRAWINGS

Further objects and advantages of the invention will become apparent from the following description and claims, and from the accompanying drawings, wherein:

FIG. 1 illustrates an outer core of a transformer in a plane sectional view as made in accordance with the present invention.

FIG. 2 illustrates an axial sectional view of the outer core of the transformer as made in accordance with the present invention.

FIG. 3 illustrates one example of the device in accordance with the invention with the transformer in a sectional view as made in accordance with the present invention.

FIG. 4 illustrates the outer core of the transformer as made in accordance with the present invention in the direction of view of arrow "A" of FIG. 1.

DETAILED DESCRIPTION OF THE PREFERRED EMBODIMENT

Referring now to the drawings in detail wherein like numerals indicate like elements throughout the several views, one sees that FIG. 1 illustrates the sectional view of an outer or ferrite core 2 of a transformer with an inner groove 3 and a coil 4 made in accordance with the present invention device. The head end 9 or beginning of coil 4 and the tail end 10 of coil 4 are guided to the outside of the coil 4 through inlet groove 5. The coil, which includes one or a plurality of coils is, sealed into a unit by heating or baking of an adherence layer which is applied according to the prior art on the winding wire immediately after the winding is completed, whereby the winding mandrel 7 remains in place. Thus it is assured that the inner diameter of coil 4 conforms with the diameter of ferrite bore 11. This requires a high degree of accuracy, since in the slot in the completed transformer there must be only 25 micrometers between the inner and outer core.

FIG. 2 illustrates a sectional view of the outer core 2 with the coil 4. In this exemplified embodiment the coil includes three coils. More or fewer coils may be used. The coil head end or beginning 9 feeds through inlet groove 5 into the inner groove 3 of the ferrite core 2. After the winding wire 6 has formed the desired number of the windings, the coil tail end 10 is fed through the inlet groove 5 and out of the ferrite core 2. The inlet groove 5 is so shaped that the coil head end or beginning 9 and the coil tail end 10 are positioned side by side and do not cross over each other.

FIG. 3 illustrates an example of the present invention in a partial view. A ferrite core 2 is mounted onto a winding mandrel 7. The coil 4 has been already partially performed. The mode of operation of the device in accordance with the invention is as follows: The winding wire 6 is fed through a transverse longitudinal 8 bore of winding mandrel 7. Before the start of winding, the ferrite core 2 is pushed onto the winding mandrel 7 in such a manner that the exit of the winding wire 6 from the transverse longitudinal bore 8 combines in the same position with inlet groove 5. The ferrite core 2 is then pushed until the winding wire 6 engages on a flank of inner groove 3. Thereby, the coil head end or beginning 9 extends from the ferrite core 2 through the inlet groove 5. The ferrite core 2 is then picked up by a part of the device (here not shown in detail) on its outer diameter and clamped and is rotated by this device part around the winding mandrel axis. The ferrite core thereby performs a continuous movement in the axial direction which corresponds to the winding wire diameter during each rotation of the ferrite core. In this manner the individual coils are wound in a tight engaging manner.

In another type of embodiment, the axial movement can naturally also be performed by the winding mandrel 7. When the desired number of coils is achieved, the end of the wire is lifted and cut off to the desired length of the winding tail end 10. The diameter of the winding mandrel 7 is only slightly smaller (in the micrometer-range) than the diameter of the ferrite bore, so that the inner diameter of the coil 4 substantially conforms with the diameter of the ferrite bore.

In FIG. 4, the device is illustrated in the direction of arrow A of FIG. 3. Thereby, the ferrite core 2 is shown in a sectional view. The coil head end 9 is already moved out of the ferrite core 2. The winding wire 6 moves through the transverse longitudinal bore 8. The ferrite core is moved into a rotational movement in the direction of the arrow and the individual coils are thereby made. Thereby, the winding wire 6 is fed thereafter through the transverse longitudinal bore 8. Naturally, the inventive device may be designed in such a manner that the ferrite core 2 is stationary and the winding mandrel 7 rotates.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A method for winding an inner coil of a transformer, wherein the transformer of the inner coil includes a ferrite core with an inner groove for receiving the coil and the ferrite core is provided with a radial inlet groove for feeding in and feeding out of the winding wire, the method including the steps of:

feeding a winding wire through a winding mandrel with a transverse longitudinal bore, pushing said ferrite core onto said winding mandrel, feeding a head end of the winding wire out of said radial inlet groove, picking up said ferrite core at a circumference thereof and moving said ferrite core rotatably and axially; and feeding out a tail end of said winding wire from said inlet groove.

2. The method in accordance with claim 1, wherein the step of axially moving said ferrite core is performed by said winding mandrel.

3. The method in accordance with claims 1 or 2 wherein said step of axially moving of said ferrite core or said winding mandrel during one revolution of said ferrite core has a distance which is substantially equal to a diameter of said winding wire.

\* \* \* \* \*